United States Patent [19]
Lefevre et al.

[11] Patent Number: 5,337,142
[45] Date of Patent: Aug. 9, 1994

[54] OPTICAL FIBER MEASURING DEVICE USING PHASE DIFFERENCE

[75] Inventors: Hervé Lefevre, Paris; Philippe Martin, Ponchartrain, both of France

[73] Assignee: Photonectics, Marly Le Roi, France

[21] Appl. No.: 910,840

[22] Filed: Jul. 7, 1992

[30] Foreign Application Priority Data

Jul. 11, 1991 [FR] France ................. 91 08765

[51] Int. Cl.⁵ .................................... G01C 19/72
[52] U.S. Cl. .................................... 356/350
[58] Field of Search ............................ 356/350

[56] References Cited

U.S. PATENT DOCUMENTS

| | | | |
|---|---|---|---|
| 4,906,096 | 3/1990 | Pavlath | 356/350 |
| 4,969,017 | 11/1990 | Lefevre et al. | 356/350 |
| 5,148,236 | 8/1992 | Blarg et al. | 356/350 |
| 5,181,078 | 1/1993 | Lefevre et al. | 356/350 |

FOREIGN PATENT DOCUMENTS 2030131  5/1991  Canada.

*Primary Examiner*—Samuel A. Turner
*Attorney, Agent, or Firm*—Mason, Fenwick & Lawrence

[57] ABSTRACT

The invention concerns an optical fiber measuring device, for example a gyrometer. The working of this device is independent of possible variations in the spectrum of the source. It includes a narrow, stable spectral filter which separates the incident flux. The modulation chain is slaved by a first detector (3). A second detector (23) receives the filtered flux. Its response is processed by a device (219) which supplies a signal that is a function of the spectrum of the light source (1).

13 Claims, 9 Drawing Sheets

OPTICAL FIBER MEASURING DEVICE USING PHASE DIFFERENCE

BACKGROUND OF THE INVENTION

The invention concerns an optical fiber measuring device that can measure the variation in a parameter producing non-reciprocal interference in an SAGNAC ring interferometer.

The SAGNAC interferometer and the physical phenomena it involves are well understood. In an interferometer of this kind, the incident beam of light waves is split into two wave trains by a separating plate or some other splitting device. The two counter-propagative waves thus created travel in opposite directions along a closed optical path and on recombining, produce interference that is dependent on the difference in phase between the two waves at the time they recombine.

The closed optical path of SAGNAC interferometers was originally defined by mirrors. It is now known that this path can be formed by a multiturn coil of monomode optical fiber.

It is also known that some physical phenomenon can produce interference on the conter-propagative waves, particularly non-reciprocal dephasing, resulting in relative phase differences between the waves which modify their interference state at the time they recombine.

By measuring this relative phase difference, it is possible to quantify the phenomenon that caused it.

The main physical phenomenon likely to create this non-reciprocal interference is the SAGNAC effect, produced when the interferometer is rotated about an axis perpendicular to the plane of the closed optical path. The FARADAY effect or colinear magneto-optical effect is also known to produce non-reciprocal effects of this kind. Other effects also can produce a non-reciprocal phase difference under certain conditions.

By contrast, variations of many parameters representative of the environment and which often interfere with measurements, produce only reciprocal effects on the SAGNAC interferometer. They do not interfere with the relative phase difference between the counter-propagative waves, and do not thus influence the measurement of the parameter considered. Such is the case of slow variations in temperature, indexes, etc., which modify the optical path followed by the waves, but modify it reciprocally.

Numerous studies have been conducted with a view to improving the sensitivity and accuracy of the measurements that can be taken with such a measuring instrument. We can, for example, consult this subject in Chapter 9 "Fiber Optic Gyroscope" by Hervé C. LEFEVRE in the work "OPTICAL FIBER SENSORS" Vol.2—ARTECH HOUSE—1989, and also the article entitled "Principle du gyrofibre, le gyromètre, des applications à haut dynamique" published in the Revue Scientifique de la Défense (1st quarter 1990) written by the same author.

Different signal processing methods are suggested. We should first of all note that the response supplied by the SAGNAC interferometer is in the form $P=P_0(1+\cos \delta\Phi)$, which means that the sensitivity of this signal in the vicinity of a phase difference $\delta\Phi=0$ must be low. A suggestion was made to introduce a phase difference modulation $\delta\Phi_m$, square in amplitude of plus or minus $\pi/2$ for example, which would move the working point and produce a periodic signal whose amplitude is a sinusoidal function of the measured parameter, and which can thus be used with greater sensitivity and stability. This phase difference is referred to as the biased phase difference $\delta\Phi_m$.

This phase difference $\delta\Phi_m$ is produced by a phase modulator placed at one end of the interferometer's multiturn coil and controlled by a signal $V_m$. This signal $V_m$ generates a phase shift $\Phi m$ on each wave and produces a phase difference between the counter-propagative waves:

$$\delta\Phi_m(t)=\Phi_m(t)-\Phi_m(t-\tau)$$

where t is time and $\tau$ the transit time of one of the waves in the coil.

It was then shown that it was possible to improve the accuracy of the measurement by using a zero method, also known as closed loop working. By this method, an additional so called counter-reaction phase difference $\delta\Phi_{CR}$ is applied, its purpose being to compensate for the phase difference $\delta\Phi_p$ produced by the measured parameter. The sum of these two phase differences, $\delta\Phi_{CR}$ and $\delta\Phi_p$, is held at zero, which allows the interferometer to be operated at maximum sensitivity. The measurement is taken by using the signal required to produce the counter-reaction phase difference $\delta\Phi_{CR}$. Measurement is thus stable and linear.

This phase difference $\delta\Phi_{CR}$ is produced by the phase modulator which is controlled by a signal $V_{CR}$. This signal $V_{CR}$ generates a phase shift $\Phi_{CR}$ on each wave, resulting in a phase difference $\delta\Phi_{CR}$ between the counter-propagative waves:

$$\delta\Phi_{CR}(t)=\Phi_{CR}(t)-\Phi_{CR}(t-\tau)$$

The slaving required for this closed loop working can be obtained through a frequency shift. This shift can be generated directly using acoustic-optical modulators or simulated by applying serrodyne modulation to a phase modulator. Such serrodyne modulation is obtained by applying rising sawtooth phase modulation.

The interference likely to arise in a device of this kind through spectral instability of the source have been identified, and a solution to the problem was suggested in French patent FR-A-2 613 067. According to the technique described in this document, the modulation of the square of the phase difference, which allows the working point of the device to be moved, comprises asymmetric pulses, that is to say pulses whose amplitude alternates between maximum and null during different durations.

It is shown that due to the dispersion of the medium constituting the fiber of the interferometer, it is possible to extract two signals from the device, one being the function of the measured parameter and the other the function of the mean of the source. To achieve this, the light flux is spectrally split into two by a filter. Provided the two fluxes are produced by a filter that is stable, the two signals that are a function of the their respective mean wavelength can be used for slaving, i.e. to stabilize the source.

Also note that French patent FR-A-2 654 827 also suggested a method for processing the signal to ensure closed loop working of the interferometer. According to this technique, the biased phase difference $\delta\Phi_m$ is modulated on four successive values $\Phi_0$, $a\Phi_0$, $-\Phi_0$, $-a\Phi_0$. This particular modulation of the phase difference also provides a means of slaving the gain of the modulation command chain and offers different specific advantages.

To date, only very cumbrous means have been envisaged to overcome measurement uncertainty caused by spectral variations of the source in phase modulated systems. The possibility of using a reference interferometer has been suggested, and even that of introducing a miniaturized array spectrometer.

SUMMARY OF THE INVENTION

The object of the invention is to propose a device which is compatible with the different phase modulation techniques and which can control the source spectrum.

Another object of the invention is to propose a source spectrum control technique that is independent of dispersion phenomena and which may therefore be used at any wavelength, including 1.3 μm for which the dispersion of silicon fibers is null.

For this purpose, the invention concerns a fiber optic measuring device in which the variation in a measured parameter causes a phase difference between two waves.

It comprises a light source with a spectrum of mean wavelength $\lambda_m$ and a SAGNAC ring interferometer, preferably monomode, in which two counter-propagative waves travel, the propagation time of the waves between separation and recombination at wavelength $\lambda_m$ being $\tau$.

A first detector receives a light flux from the interferometer and converts it into an electrical signal representing the total phase difference $\delta\Phi_t$ between the counter-propagative waves. A phase modulator acts on the phase difference that exists between the two counter-propagative waves by generating a phase difference $\delta\Phi_m + \delta\Phi_{CR}$ made up of a biased component $\delta\Phi_m$ and a counter-reaction component $\delta\Phi_{CR}$. First electrical means receive an electrical signal from the first detector and supply a signal that is a function of the measured parameter. The said signal produces the phase modulator command component $\Phi_{CR}$, which is determined in such a way that the phase difference $\delta\Phi_{CR}$ that it produces between the counter-propagative waves compensates for the phase difference $\delta\Phi_p$ created by the measured parameter.

The device of the invention also comprises a narrow, stable spectral filter, inserted between the interferometer and the first detector, which splits the incident flux into a main flux sent to the first detector, and a filtered flux.

The first electronic means comprise means for measuring and slaving the gain of the phase modulation chain, starting from an operation performed by the first electronic processing means on the signal received from the first detector.

It comprises a second detector which receives the filtered flux. The response of this second detector is processed by the second electronic means whose components act on the signal received from the second detector to provide both a gain measurement, the said gain measurement being identical to that performed by the first measurement means on the signal received from the first detector, and a signal that is a function of the difference between the mean wavelength $\lambda_{mf}$ of the filtered flux and the mean wavelength $\lambda_{mp}$ of the main flux.

In a preferred construction method, the signal which is a function of the spectrum of the light source supplied by the second means of electronic processing, commands the said light source so as to slave the mean wavelength $\lambda_{mp}$ of the main flux against the mean wavelength $\lambda_{mf}$ of the filtered flux.

Preferably, the first electronic means each comprises an analog-to-digital converter which digitizes the electrical signal received respectively from the first detector and from the second detector, the modulation control signal $V_m$ being determined in such a way that the phase difference $\delta\Phi_m$ which it produces between the counter-propagative waves periodically takes a number of values of a multiple of four, linked in four's by the equations:

$$\delta\Phi_1 = \Phi_0 \qquad \delta\Phi_2 = a\Phi_0$$
$$\delta\Phi_3 = -\Phi_0 \qquad \delta\Phi_4 = -a\Phi_0$$

where $a$ is a positive fixed constant and $\Phi_0$ a reference phase difference that is dependent on $a$; the first electronic means produces a signal that is a function of the measured parameter by using the four values $x_{1p}$, $x_{2p}$, $x_{3p}$, $x_{4p}$ supplied by the first detector in response to four values of the command signal $\Phi_m$ according to the formula:

$$(x_{1p} + x_{4p}) - (x_{2p} + x_{3p}).$$

In a first construction method, the command signal $V_m$ is determined in such a way that the phase difference $\delta\Phi_m$ periodically takes four values.

It is particularly useful that the electronic means maintains the gain of the modulation chain constant by producing a signal that is a function of the said gain using the four values $x_{1p}$, $x_{2p}$, $x_{3p}$, $x_{4p}$ supplied in response to four values of the command signal $v_m$ according to the formula $(x_{1p} + x_{3p}) - (x_{2p} + x_{4p})$, the said signal acting on the modulation chain in such a way so as to maintain the gain constant, by satisfying the condition: $\cos\Phi_0 = \cos a\Phi_0$, and that the second electronic means (27) produces a signal that is a function of the difference between the mean wavelength $\lambda_{mf}$ of the filtered flux and the mean wavelength $\lambda_{mp}$ of the main flux using the four values $x_{1f}$, $x_{2f}$, $x_{3f}$, $x_{4f}$ supplied in response to four values of the command signal $\Phi_m$ according to the formula $(x_{1f} + x_{3f}) - (x_{2f} + x_{4f})$.

In a second construction method, the command signal $V_m$ is determined is such a way that the phase difference $\delta\Phi_m$ periodically takes eight values:

$$\delta\Phi_1 = (\Phi_0 + d\Phi_0) \qquad \delta\Phi'_1 = (\Phi_0 - d\Phi_0)$$
$$\delta\Phi_2 = -(\Phi_0 + d\Phi_0) \qquad \delta\Phi'_2 = -(\Phi_0 - d\Phi_0)$$
$$\delta\Phi_3 = a(\Phi_0 + d\Phi_0) \qquad \delta\Phi'_3 = a(\Phi_0 - d\Phi_0)$$
$$\delta\Phi_4 = -a(\Phi_0 + d\Phi_0) \qquad \delta\Phi'_4 = -a(\Phi_0 - d\Phi_0)$$

These values of the phase difference produce in response, for the main flux, the values $x_{1p}$, $x'_{1p}$, $x_{2p}$, $x'_{2p}$, $x_{3p}$, $x'_{3p}$, $x_{4p}$, $x'_{4p}$, and for the secondary flux, the values $x_{1f}$, $x'_{1f}$, $x_{2f}$, $x'_{2f}$, $x_{3f}$, $x'_{3f}$, $x_{4f}$, $x'_{4f}$, with the first processing unit regrouping in two's the values $x_{1p}$ to $x'_{4p}$ according to the law:

$$x_{1p} = (x_{1p} + x'_{1p})/2, \quad x_{2p} = (x_{2p} + x'_{2p})/2$$

$$x_{3p} = (x_{3p} + x'_{3p})/2, \quad x_{4p} = (x_{4p} + x'_{4p})/2$$

to perform the operation $(x_{1p}+x_{3p})-(x_{2p}+x_{4p})$ and then using the signal thus produced to slave the gain of the modulation chain, and that the second processing unit processing the signal sent from the second detector selects the states $x_{1f}, x_{2f}, x_{3f}, x_{4f}$ and performs the operation $(x_{1f}+x_{3f})-(x_{2f}+x_{4f})$, using the signal thus produced to control the value of $d\Phi_0$ and to generate a measurement of the difference between the mean wavelength $\lambda_{mf}$ of the filtered flux and the mean wavelength $\lambda_{mp}$ of the main flux.

Advantageously, a is chosen equal to 3 or even 2.

The spectral filter is, preferably, a stable Fabry-Perot filter, the mean wavelength $\lambda_m$ of the spectrum of the source being 1.3 μm.

Preferably, the light source comprises two elementary sources associated in such a way that any variation in the relative intensity of the elementary sources can be used to vary the mean wavelength of the light source.

The invention also concerns a gyrometer in compliance with the measurement device described above, the measured parameter being the rotational speed of the interferometer.

It also concerns an inertial navigation or stabilization central unit comprising at least one such gyrometer.

BRIEF DESCRIPTION OF THE DRAWINGS

The invention will now be described with reference to the figures in which.

DETAILED DESCRIPTION OF THE PREFERRED EMBODIMENT

Figure 1:
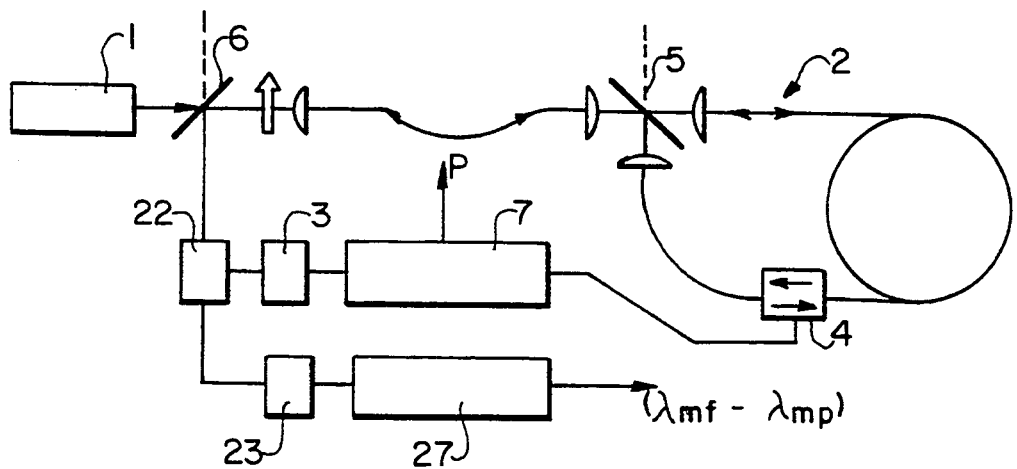
FIG. 1 shows a general representation of the measuring device of the invention.

The optical fiber measuring device of the invention comprises an extended spectrum light source (1), commonly a super luminescent diode or a fiber source, doped with rare-earth element, a monomode optical fiber SAGNAC ring interferometer, globally designated by reference 2.

This ring interferometer (2) comprises a separator (5) which separates the waves at the input to the interferometer and recombines them at the output, and a closed optical path comprising a monomode optical fiber wound upon itself.

The term large spectrum or wide spectrum source is used here to designate a source whose spectrum width, at mid height, is in the order of 30 nm, e.g. in the range 5 to 50 nm for a mean wavelength of 850 nm.

Good results are also obtained with sources having a mean wavelength of 1050 nm, 1300 nm or 1550 nm.

The measuring device also comprises a first detector (3) which supplies a signal that is a function of the state of wave interference at the output of the interferometer itself.

The optical signal is sent to the first detector (3) via a separator (6).

A modulator (4) is interposed at one end of the interferometer's optical path which, when commanded by an electrical signal, introduces a phase difference between the two waves. The working of the interferometer is enhanced by interposing a polariser and a spatial filter between light source (1) and the input to the ring, i.e. between separators (5) and (6). In a known way, this spatial filter is made up of a monomode optical fiber.

Electronic means (7) command the phase modulator (4) to counter-react in function of the signal received by the first detector (3). The electronic means (7) is configurated in such a way that any variation in the demodulated error signal in function of the phase difference produced between the two waves in the vicinity of zero is approximately linear. This arrangement confers excellent sensitivity in the variation in the demodulated error signal in the vicinity of a zero phase difference, although it can be understood that because the dependence of the signal relative to the phase difference is cosinoidal in nature, sensitivity in vicinity of zero phase difference is very low.

In addition, these electronic means (7) serve to slave the gain of the command chain of the modulator (4).

Moreover, the electronic means (7) serves to maintain the phase difference null i.e. when the variation in the measured parameter introduces a phase difference between the two waves in the interferometer, this phase difference produces a variation in the signal sent by the first detector (3) causing, via electronic means (7) and modulator (4), an action which is equal but opposite to the phase difference initially produced in such a way that the global phase difference is brought to the null value. With the first loop slaving the gain of the modulation command chain, the measurement of counter-reaction phase difference is very accurate.

Finally the electronic means (7) uses the phase modulator command signal to supply a signal that is a function of the variation in the measured parameter.

The total phase difference $\delta\Phi_t$ between the counter-propagative waves, is the sum of the phase difference $\delta\Phi_p$ introduced by the effect of the measured parameter and of the phase difference $\delta\Phi_m+\delta\Phi_{cr}$ introduced by phase modulator (4). $\delta\Phi_m$ is the biased phase modulation. $\delta\Phi_{cr}$ is the counterreaction phase difference which counteracts $\delta\Phi_p$ to provide equilibrium.

Different construction methods for electronic means (7) are possible and have been defined, for example in the documents mentioned above. Advantageously, they include (FIGS. 4 and 5) an analog-to-digital converter (8) which receives the signal supplied by the receiver (3). A digital processing system (9) produces a signal that is a function of the measured parameter which is then filtered by a filter (10) and sent to a register (11) which stores the value of the measured parameter.

An accumulator (20), supplied by register (11), generates a counter-reaction signal that is a function of the measured parameter which it supplies to the first input of an adder (13). The second input of adder (13) is supplied by a modulation generator (12). The set of digital components are synchronized by clock (21).

A digital-to-analog converter (14) receives the output signal from adder (13) and supplies an amplifier (15) which in turn commands the phase modulator (4).

The slaving and measurement of the gain of the modulation command chain are performed by electronic means (19). The means comprises a processing system (16) which is supplied with the signal output by the analog-to-digital converter (8), an integrating filter (17), and a digital-to-analog converter (18) whose output signal commands the gain of amplifier (15) or the reference voltage of digital-to-analog converter (14).

In a preferred construction method, the modulation generator (12) produces a modulation signal such that the phase difference $\delta\Phi_m$ takes successively the values $\delta\Phi_1, \delta\Phi_2, \delta\Phi_3, \delta\Phi_4$, and linked by the equations:

$$\delta\Phi_1 = \Phi_0 \qquad \delta\Phi_2 = a\Phi_0$$
$$\delta\Phi_3 = -\Phi_0 \qquad \delta\Phi_2 = -a\Phi_0$$

where a is a fixed positive constant and $\Phi_0$ is a reference phase difference dependent on a, satisfying, preferably the condition:

$$\cos\Phi_0 = \cos a\Phi_0$$

The response to this modulation signal, received by the first detector (3) and digitized by converter (8), periodically takes four values $x_{1p}, x_{2p}, x_{3p}, x_{4p}$ corresponding respectively to the modulation level $\delta\Phi_1, \delta\Phi_2, \delta\Phi_3$ and $\delta\Phi_4$.

The operation $(x_{1p}+x_{3p})-(x_{2p}+x_{4p})$ is performed by the digital processing system (16). It supplies a signal $x_g$ which is independent of the phase difference $\delta\Phi_p$ due to the measured parameter, but is however significant of the gain of the modulation command chain. In particular, $x_g=0$ when the condition $\cos\Phi_0=\cos a\Phi_a$ is respected. This signal $x_g$ can thus be used as an error signal for a slave loop for the gain of the modulation command chain.

The electronic means (9) performs the operation $(x_{1p}+x_{4p})-(x_{2p}+x_{3p})$ to produce a signal $x_p$ dependent on the non-reciprocal phase difference $\delta\Phi_p$ to be measured in the interferometer. The signal $x_p$ is used as an error signal to slave the total phase difference of the interferometer at zero by compensating for the non-reciprocal phase difference $\delta\Phi_p$ with an opposite phase difference $\delta\Phi_{cr}$. Since this phase difference $\delta\Phi_{cr}$ is generated via the same command chain as the modulation $\delta\Phi_m$, the slaving of the gain of this chain with the signal $x_g$ provides a stable and controlled measurement of $\delta\Phi_{cr}$ and thus in turn of $\delta\Phi_p$ which is opposite it, and which is the parameter we are seeking to measure.

Figure 6:
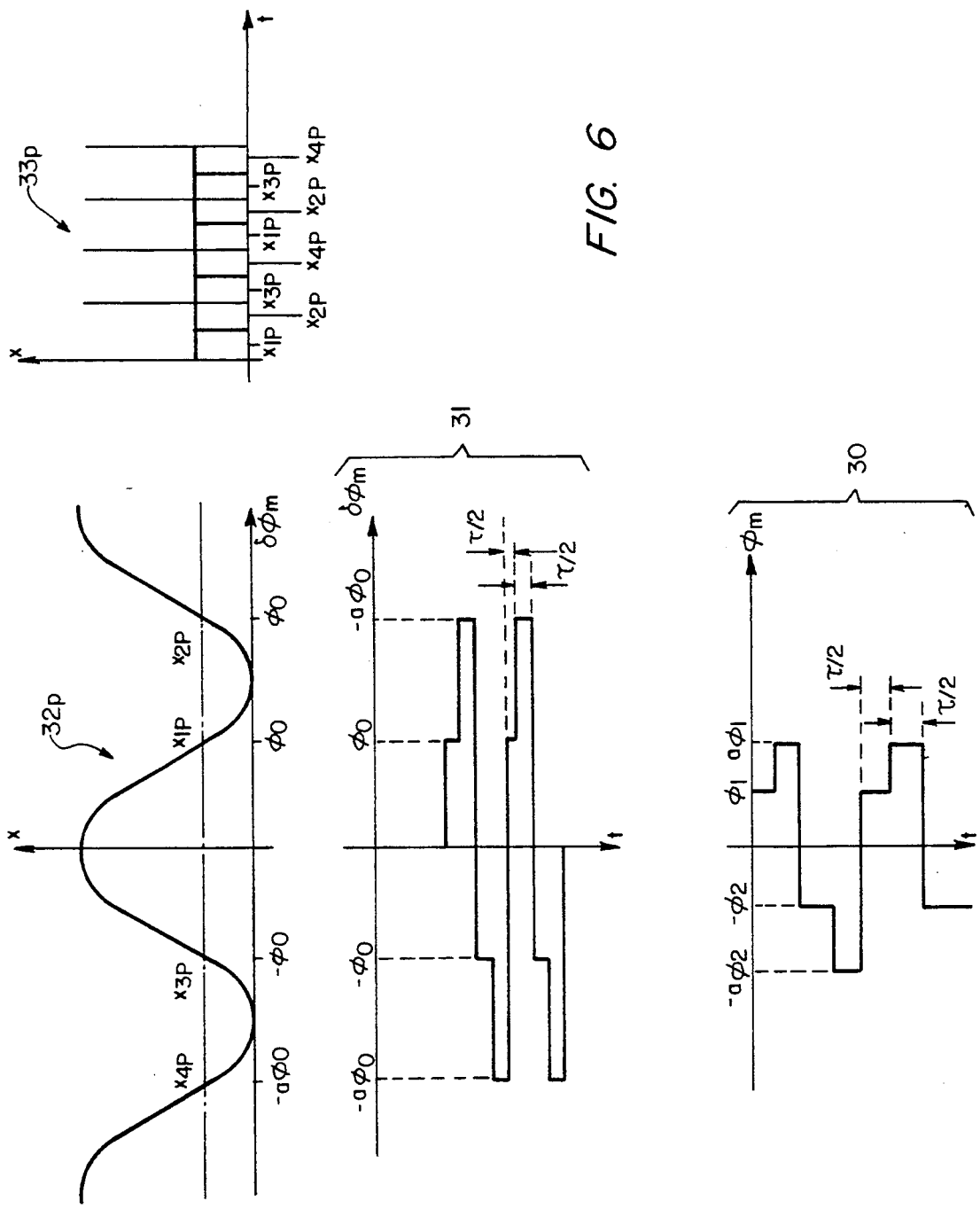
FIG. 6 shows for a mean source spectrum wavelength $\lambda_m$, the phase shift applied by the modulator, the phase difference in the interferometer and the corresponding signal produced by the detector when the phase difference generated by the measured parameter is null, and with the gain of the modulation chain slaved.
Figure 7:
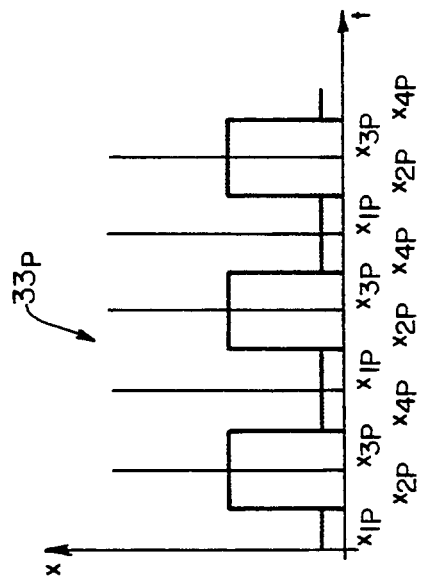
FIG. 7 shows, for a mean source spectrum wavelength $\lambda_m$, the phase difference in the interferometer and the corresponding signal produced by the detector at the time the measured parameter varies, and with the gain of the modulation chain slaved.
Figure 7:
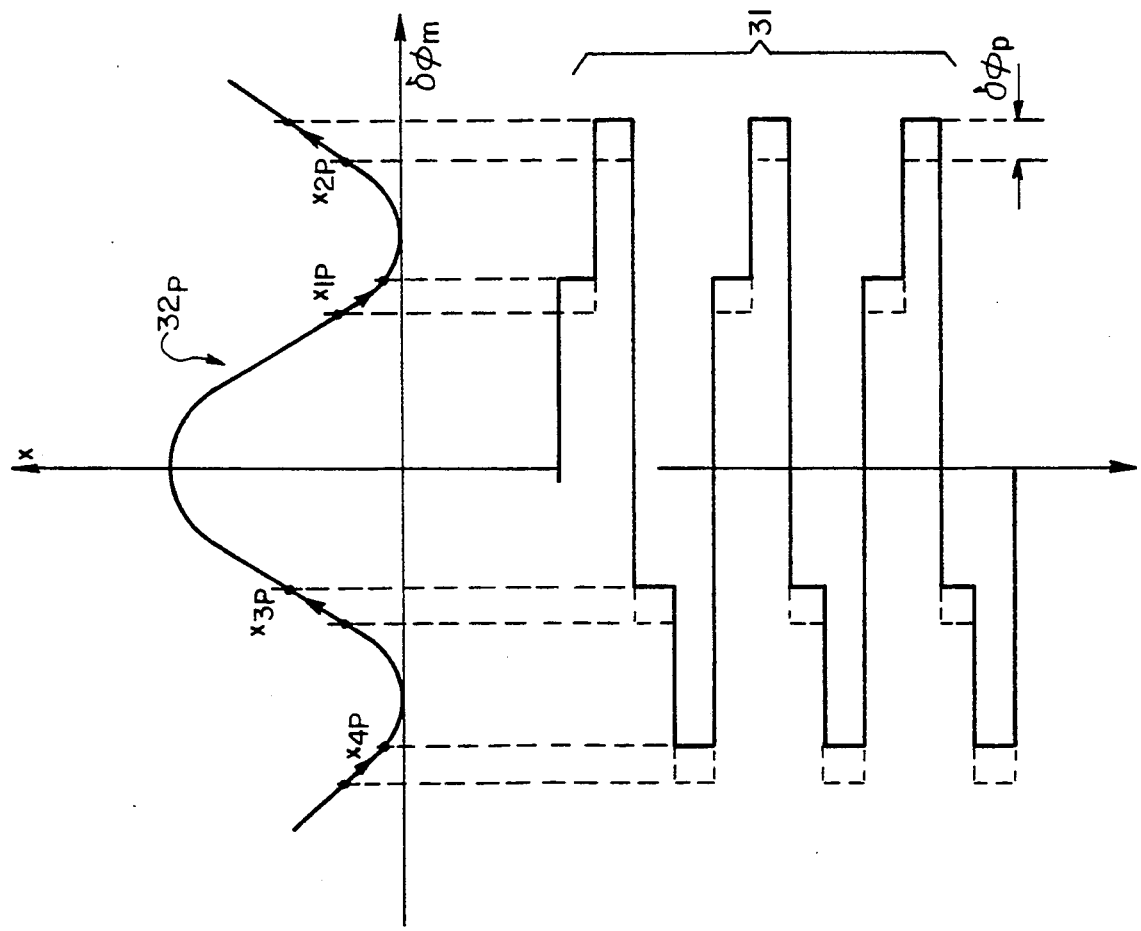
Figure 8:
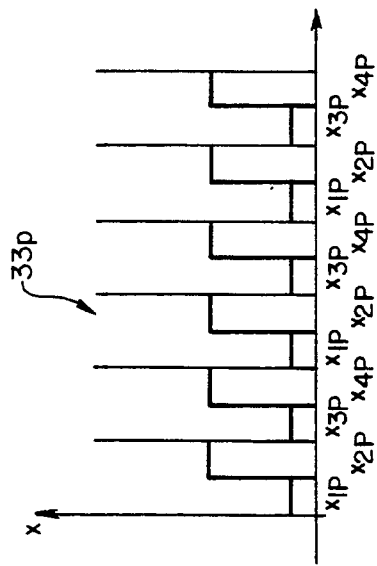
FIG. 8 shows, for a mean source spectrum wavelength $\lambda_m$, the phase difference in the interferometer and the signal produced by the detector at the time the gain of the modulation command chain varies, when the phase difference generated by the measured parameter is null.
Figure 8:
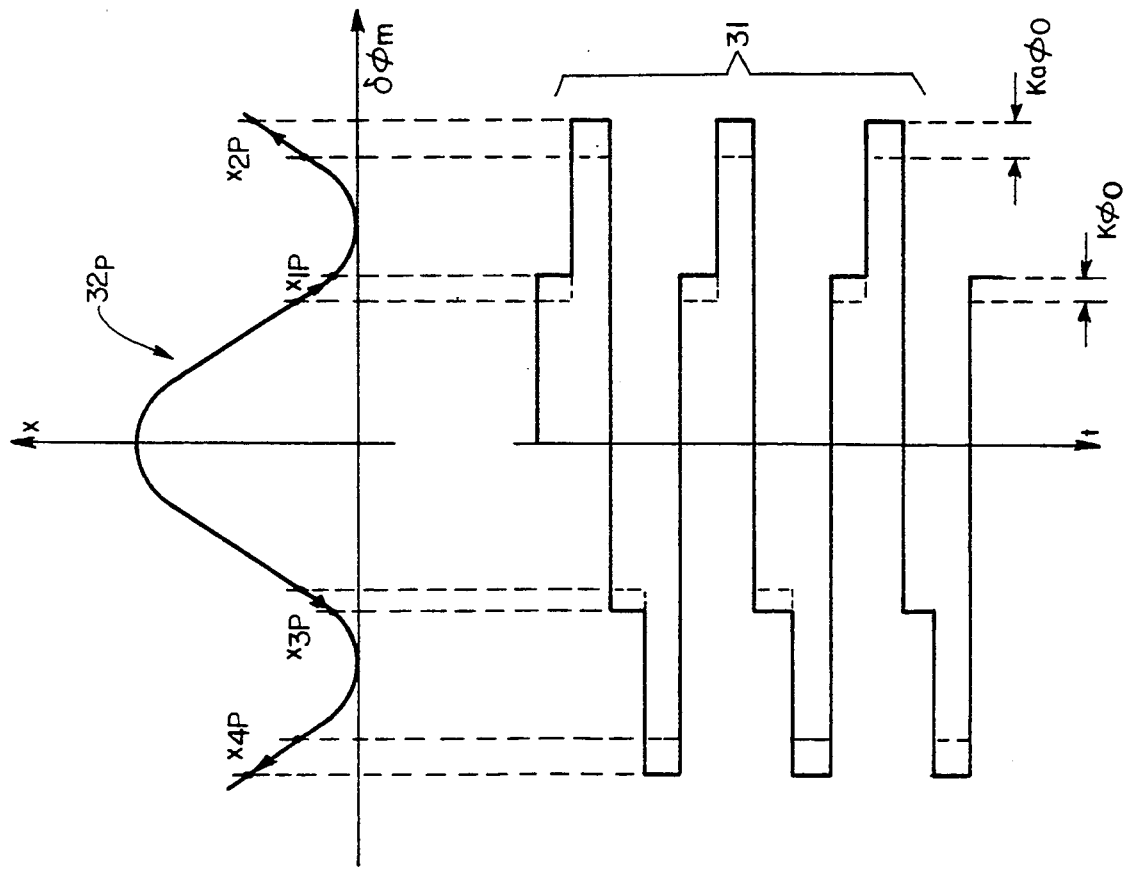

FIGS. 6 to 8 show under various conditions, and when the spectrum of the source is slaved, the dephasing $\Phi_m$ of modulation (30), the phase difference $\delta\Phi_m$ (31), the response of the interferometer (32), and the signal (33) supplied by the first detector in response to the phase difference $\delta\Phi_m$ (31).

The period of the modulation signal $V_m$ of the phase difference is equal to $2\tau$ where $\tau$ is the transit time of a wave at the mean wavelength $\lambda_m$ in the coil; it produces a dephasing modulation $\Phi_m$ on each wave.

Each period of modulation $\Phi_m$ is composed of a pulse of duration $\tau/2$ and amplitude $\Phi_1$, and a train of pulses of the same duration and amplitude, respectively $a\Phi_1, -\Phi_2$ and $-a\Phi_2$, such as $\Phi_1+\Phi_2=\Phi_0$.

a is preferably chosen to equal 2 or 3.

The situation shown in FIG. 6 is that in which the measured parameter is null and the gain of the measurement chain slaved. Signal (33) supplied by the first detector (3) presents values $x_{1p}, x_{2p}, x_{3p}, x_{4p}$ that are equal.

A variation in the measured parameter, shown in FIG. 7, causes a translation $\delta\Phi_p$ in the modulation of the phase difference $\delta\Phi_m$ shown in (31) and results in an imbalance between the signals: $x_{1p}=x_{4p}\neq x_{2p}=x_{3p}$.

FIG. 8 shows how the system behaves when the gain of the modulation chain varies. The homothetic variation $(1+K)$ of the phase difference $\delta\Phi_m$ shown at (31) produces an imbalance between the signals: $x_{1p}=x_{3p}\neq x_{2p}=x_{4p}$.

The device of the invention comprises a stable spectral filter (22) placed at the output of the interferometer (2). This filter is arranged in such a way that it samples a part of the spectrum, referred to as the filtered spectrum, on the optical signal returning from the interferometer, the mean wavelength of this filtered spectrum being represented by $\lambda_{mf}$.

Different means can be implemented to obtain the main flux ($133_p$) and filtered flux ($133_f$) from the incident flux (133).

Figure 2:
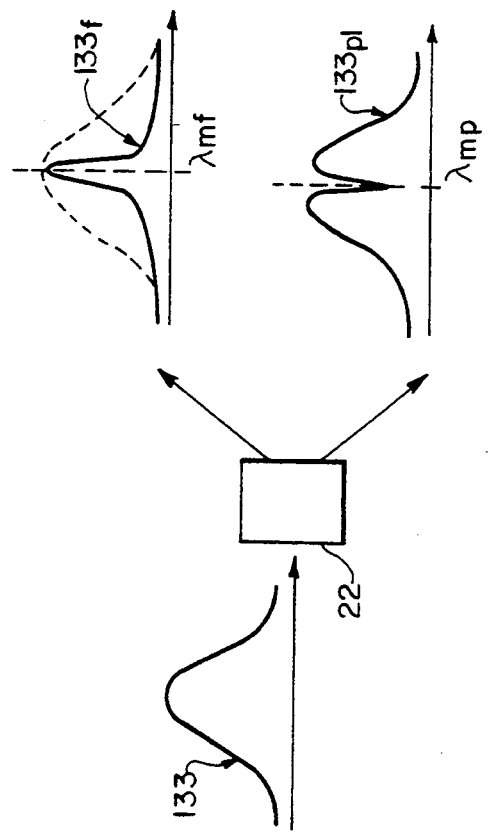
FIGS. 2 and 3 each show how the incident flux is split to provide the main flux and the filtered flux respectively.

Filter 22 directly receives the incident flux (133) (FIG. 2), and can produce the main flux ($133_{p1}$) by reflection for example and the filtered flux ($133_f$), complementary, by transmission.

Figure 3:
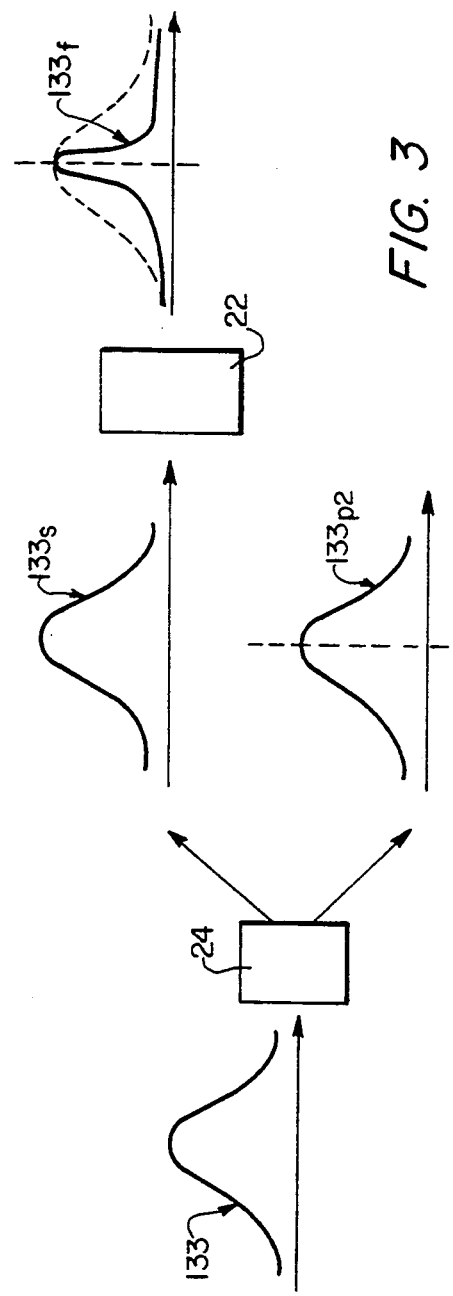

It is also possible to place a separator (24) on the path of the incident flux (133), in order to sample a part of the incident flux without spectral selection. The remaining flux constitutes the main flux ($133_{p2}$), the sampled flux ($133_s$) being sent to a filter (22) which produces the filtered flux ($133_f$) (FIG. 3).

The individual roles of the two channels thus formed are therefore 1) to measure the parameter and slave the gain of the modulation chain, and 2) supply a measurement of the spectrum of the source. In the detailed description given here, it is assumed that the main flux is used to measure the parameter and slave the gain of the modulation chain, and the filtered flux used to provide the spectral measurement. The respective role of the fluxes may be inverted.

The complement of the filtered spectrum is referred to as the main spectrum, its mean wavelength being $\lambda_{mp}$. The main spectrum is sent to the first detector (3) whose response is processed by the first electronic means (8) to

(21) described above which produce the value of the measured parameter, compensate for the phase difference due to the measured parameter and slave the gain of the modulation chain.

Since the spectral selection performed by the filter is narrow, the energy contained in the main spectrum and also its mean wavelength $\lambda_{mp}$ differ very little from the energy and mean wavelength of the whole spectrum, and can accordingly be assimilated.

Thus, most of the available energy is contained in the main spectrum from which the signal can be processed with a satisfactory signal-to-noise ratio, analog to that obtained when the filtered spectrum is not sampled.

The filtered spectrum sampled on the input wave train is sent to a second detector (23) whose response is electronically processed by processing unit (27).

Figure 4:
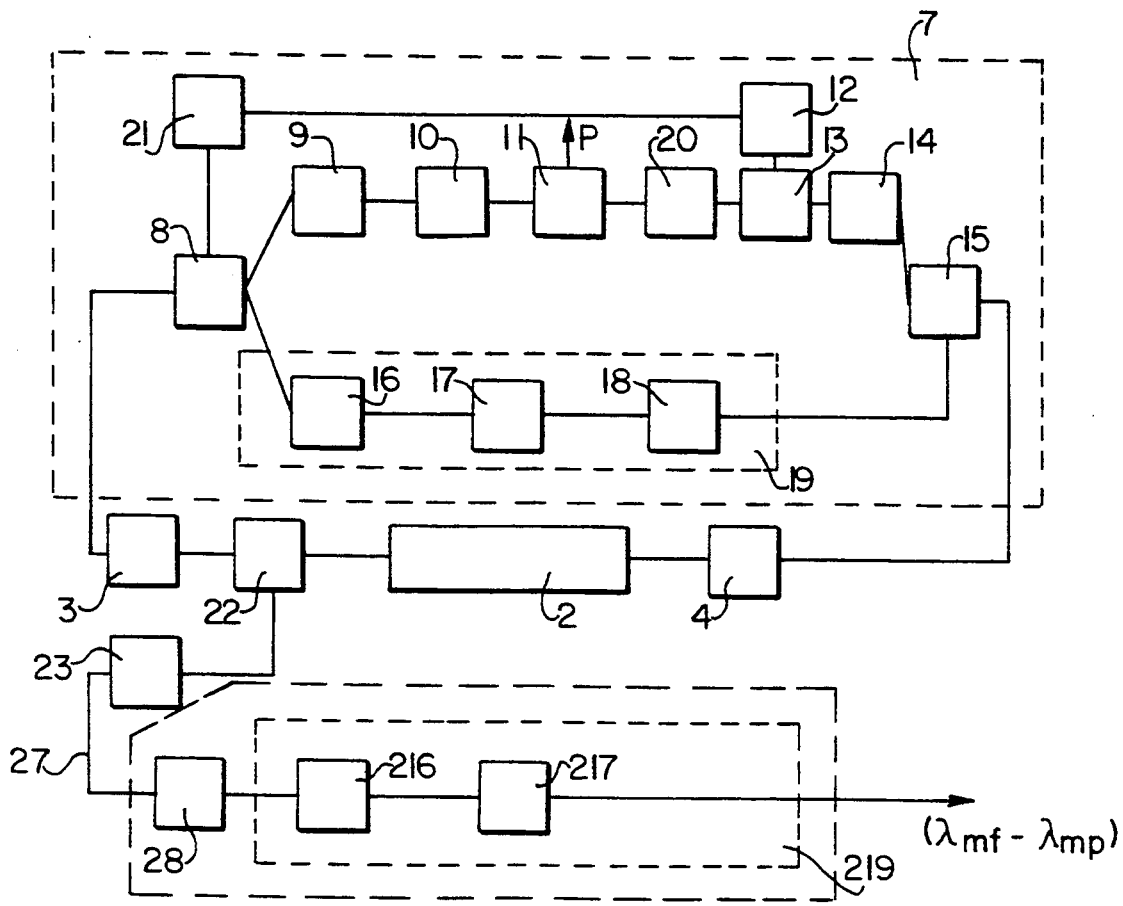
FIG. 4 shows a flow chart of the signal processing performed according to a first construction method.
Figure 5:
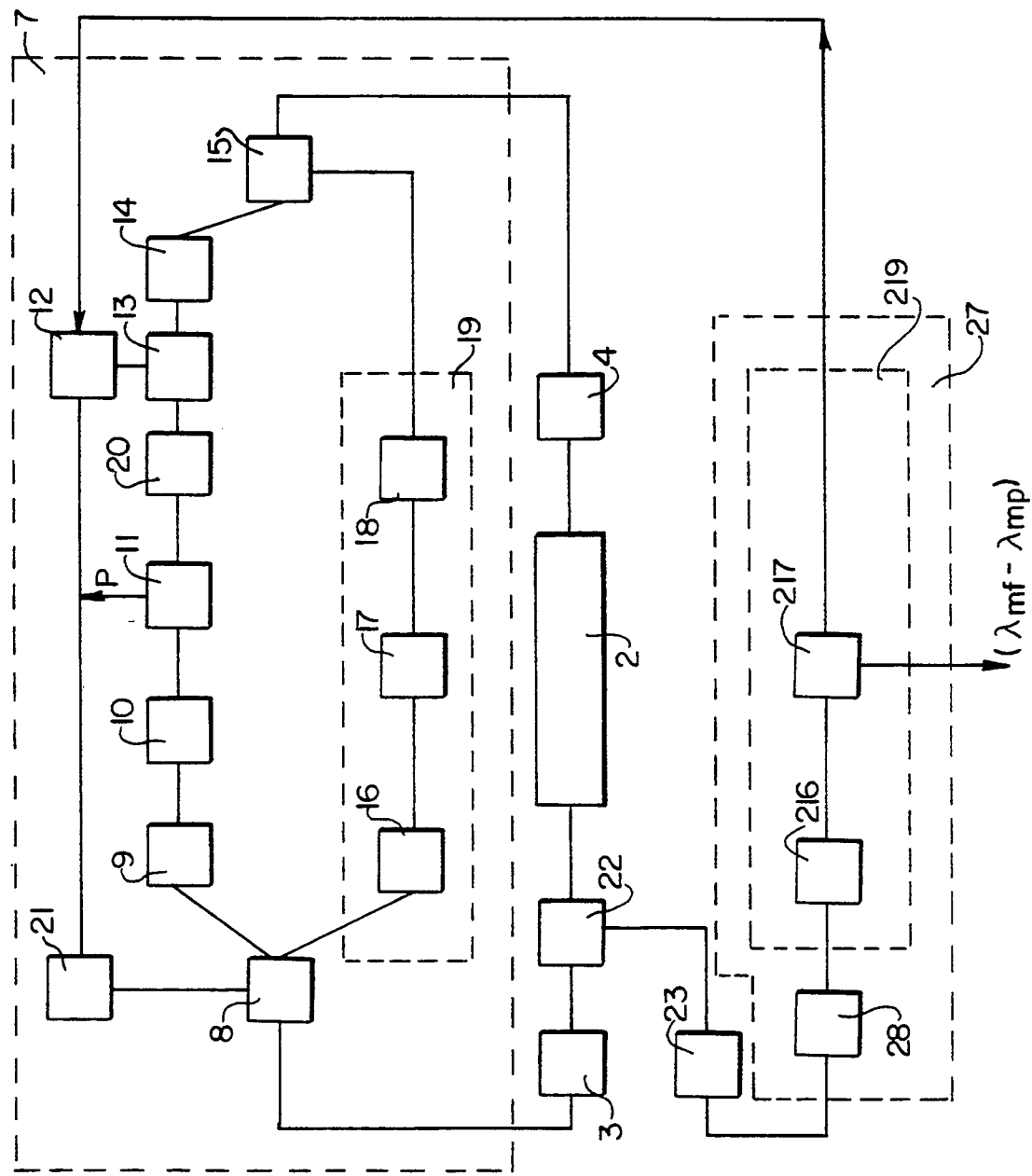
FIG. 5 shows a flow chart of the signal processing performed according to a second construction method.

This processing unit (27), as shown in FIGS. 4 and 5, comprises an analog-to-digital converter (28) which receives the signal produced by the second detector (23), and second electronic means identified collectively under the reference (219). These second electronic means (219) comprise a second processing system (216) and a wavelength difference register (217).

The processing system (216) effects the same processing on the signal it receives from the second detector (23) as processing unit (16) performs on the signal it receives from the first detector (3).

When mean wavelengths $\lambda_{mp}$ and $\lambda_{mf}$ of the main flux and filtered flux respectively are the same, the interferometer response curves (33) for each of these fluxes are one and the same, the signals produced by the first means (19) for the main flux and those supplied by the second means (219) for the filtered flux being the same By contrast, when the main spectrum is shifted relative to the response of the filter, i.e. relative to the spectrum of the filtered flux, the response curves $32_p$ and $32_f$ differ from each other and the signal produced by system (216) is different from zero. This signal is representative of the shift in wavelength between the mean wavelength of the source and the central wavelength of the response of the filter.

Figure 9:
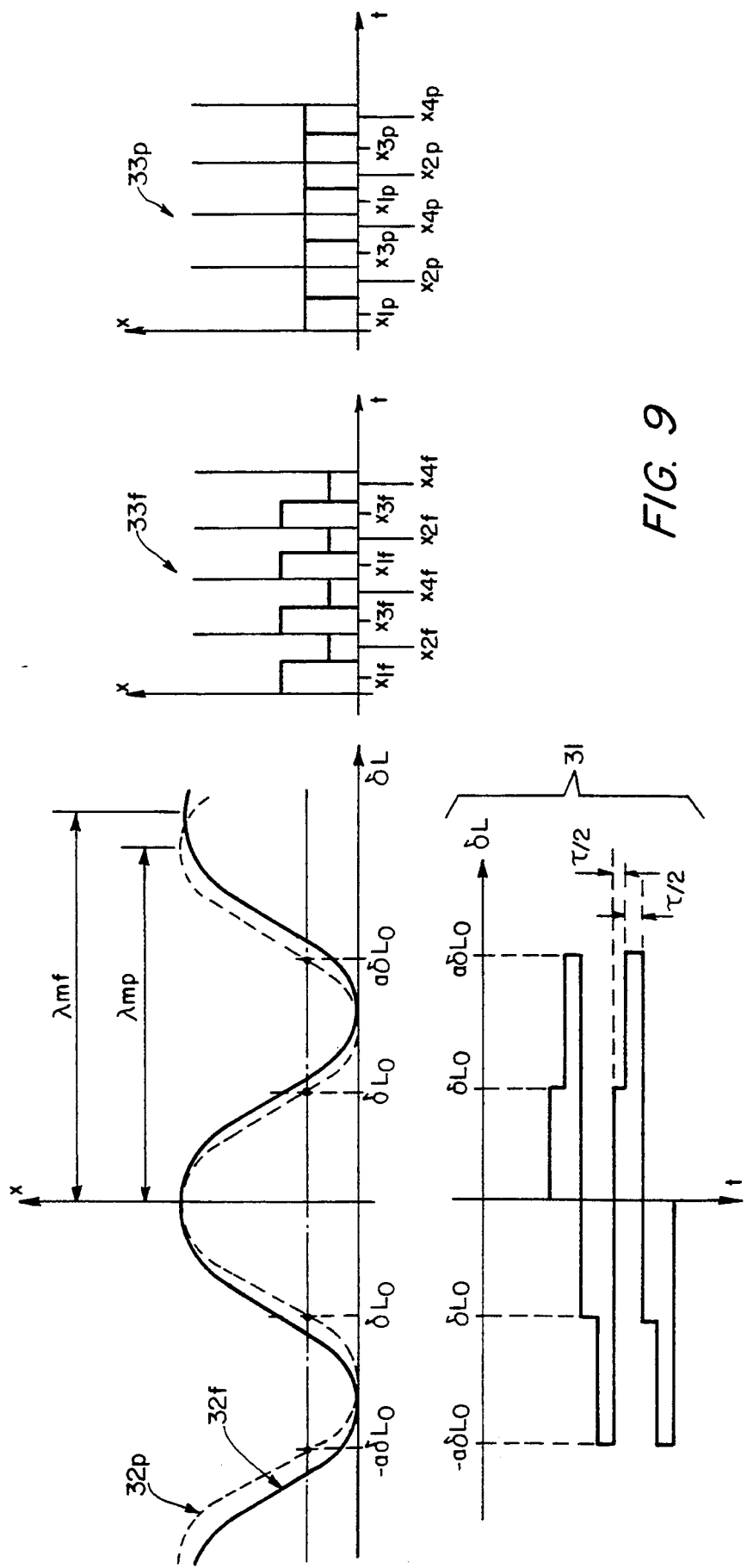
FIG. 9 shows, for two mean wavelengths $\lambda_{mp}$ and $\lambda_{mf}$, the difference in optical path in the interferometer, and the corresponding signals produced by each detector when the phase difference generated by the measured parameter is null and the gain of the modulation chain is slaved for the wavelength $\lambda_{mp}$, with a first type of modulation.
Figure 10:
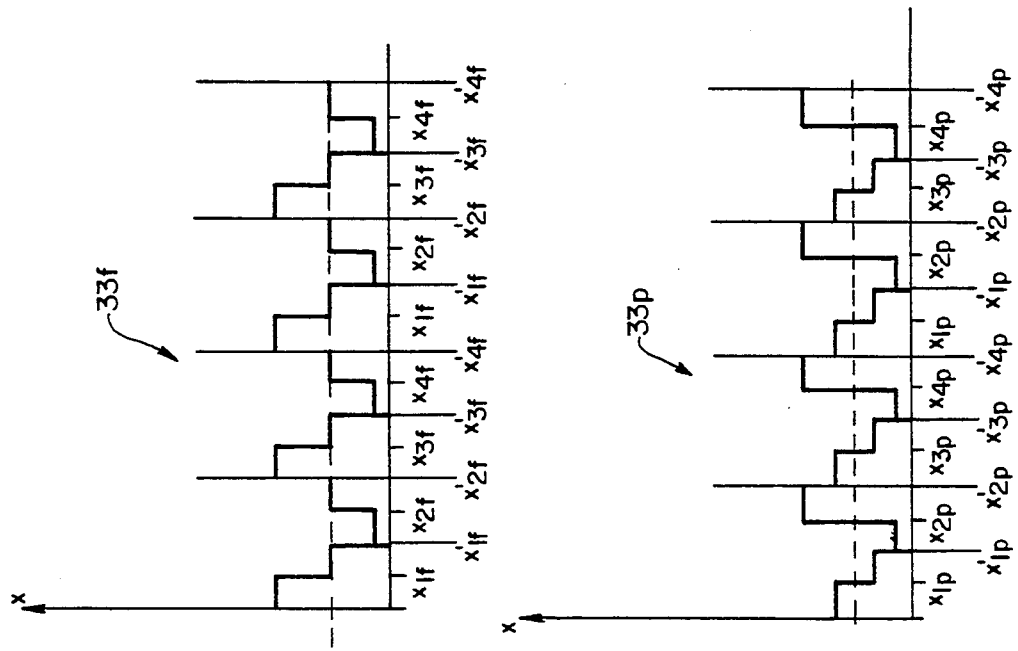
FIG. 10 shows, for two mean wavelengths $\lambda_{mp}$ and $\lambda_{mf}$, the difference in optical path in the interferometer and the corresponding signals produced by each detector when the phase difference generated by the measured parameter is null, and the gain of the modulation chain is slaved for the wavelength $\lambda_{mp}$, with a second type of modulation.
Figure 10:
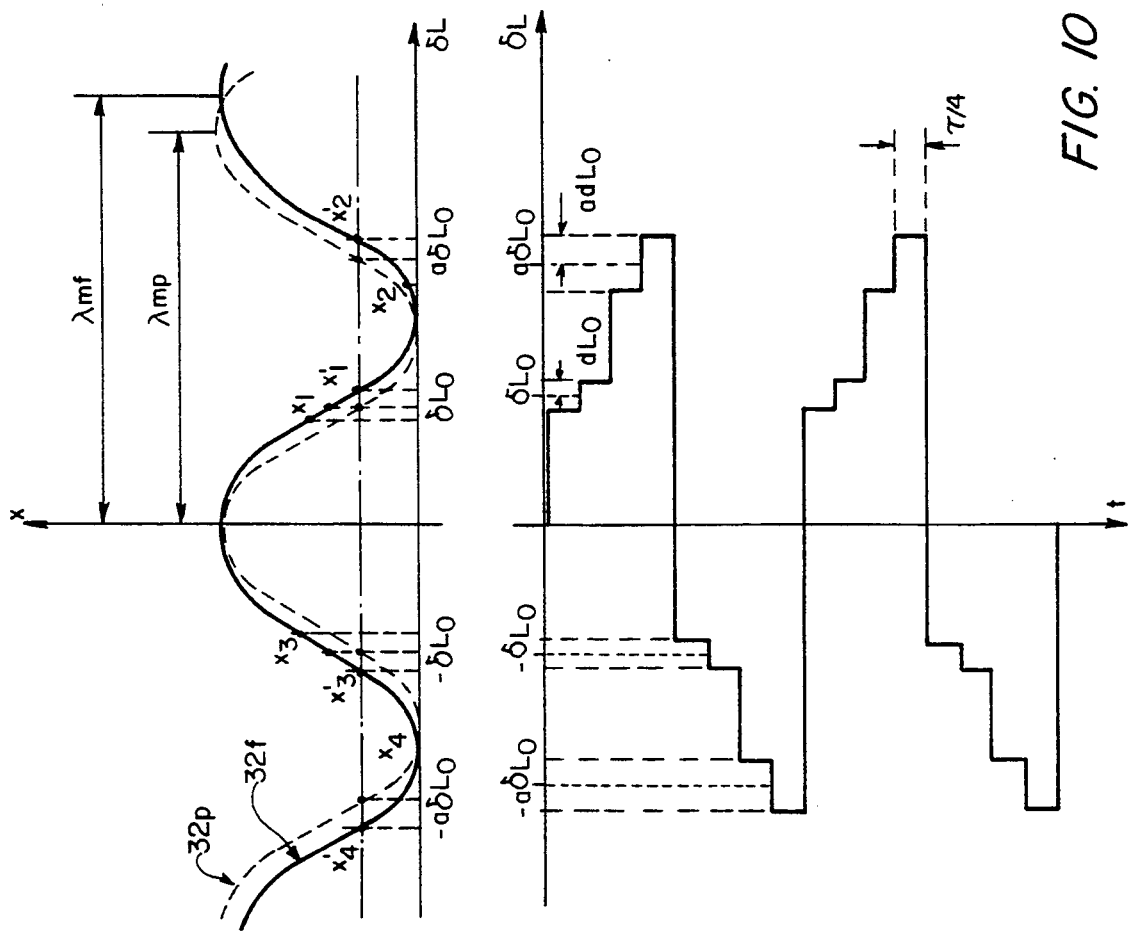

FIG. 9 shows a displacement of the source spectrum relative to the filter. Here, the mean value of the source spectrum no longer coincides with the filter's spectral band, which means that mean wavelengths $\lambda_{mf}$ of the filtered spectrum and $\lambda_{mp}$ of the main spectrum are different. The response $32_p$ and $32_f$ of the interferometer at these wavelengths are therefore different, mutually deduced by similarity in the same way as results obtained are mutually deduced, at a given wavelength, for two different values of modulation chain gain.

The filtered and main optical path each supply a signal, ($33_p$) and ($33_f$) respectively, analog to signal (33) shown on FIGS. 6 to 8 and described above.

The signal supplied by the main spectrum is processed by the first electronic means (7) which uses it to command the modulator (4) and ensures closed loop working of the device. In continuous working (the effect of the measured parameter compensated for by counter-reaction modulation and slaved gain of the modulation chain), the values $x_{1p}$, $x_{2p}$, $x_{3p}$, $x_{4p}$ of signal $33_p$ are equal. As we have seen, variations in modulator chain gain and central wavelength $\lambda_{mp}$ have a similar effect on these signals, compensation being effected via the gain slave loop.

However, the mean wavelength $\lambda_{mf}$ of the filtered flux, determined by filter (22) whose central wavelength is $\lambda_{mf}$, is invariable. Any modification of the interferometer's response caused by one of the slave loops compensating for a spectral displacement of the source will modify the signal produced by the filtered spectrum.

The signal provided by the processing system (216) can therefore be used to obtain a signal that is a function of the shift between the average wavelength of the source and the response of the filter. This signal can be used for different purposes, for example to slave the source spectrum. For example, it can command the temperature of the source, the pumping wavelength in the case of a terre rare doped source, or more generally any parameter that enables the spectrum to be varied, depending on the source type used.

The source spectrum can easily be slaved in the particular case where it comprises two elementary sources, each with a spectrum 201, 202, shifted relative to each other (FIG. 11). The total spectrum 203 of the source is the sum of the elementary source spectrums 201, 202.

Modification of the relative intensity of the elementary sources allows the mean wavelength of the source to be moved and therefore controlled.

Figure 11A:
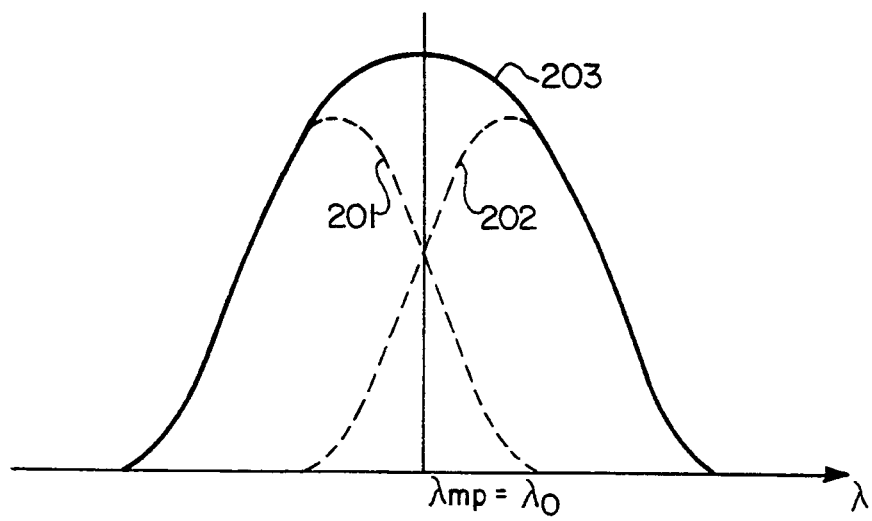
FIGS. 11A, 11B, 11C show the global spectrum of a source comprising two elementary sources.

FIG. 11A shows the total spectral distribution, when the intensities of the elementary sources are equal.

Figure 11B:
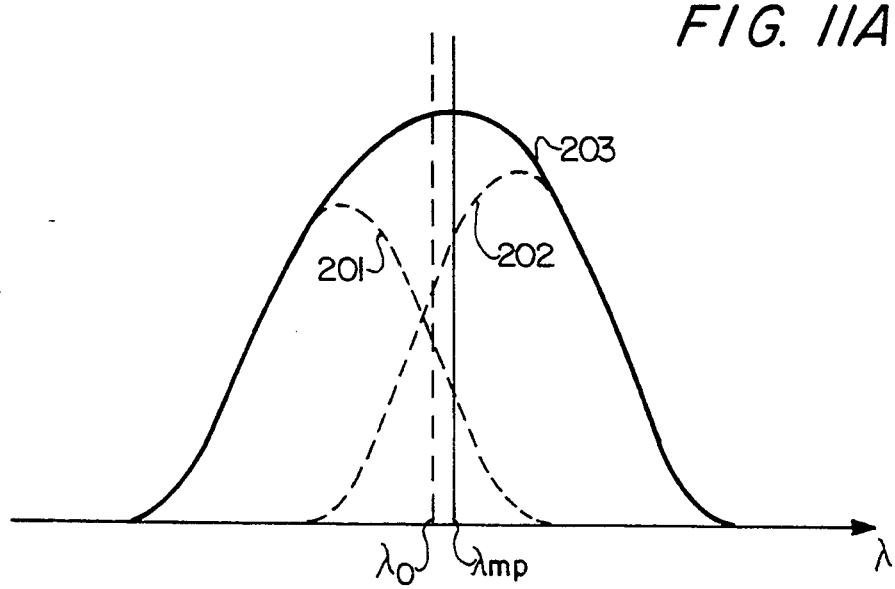

In FIG. 11B, the intensity of the elementary source with spectrum 202 is greater, the mean wavelength of the source being shifted towards the larger wavelengths.

Figure 11C:
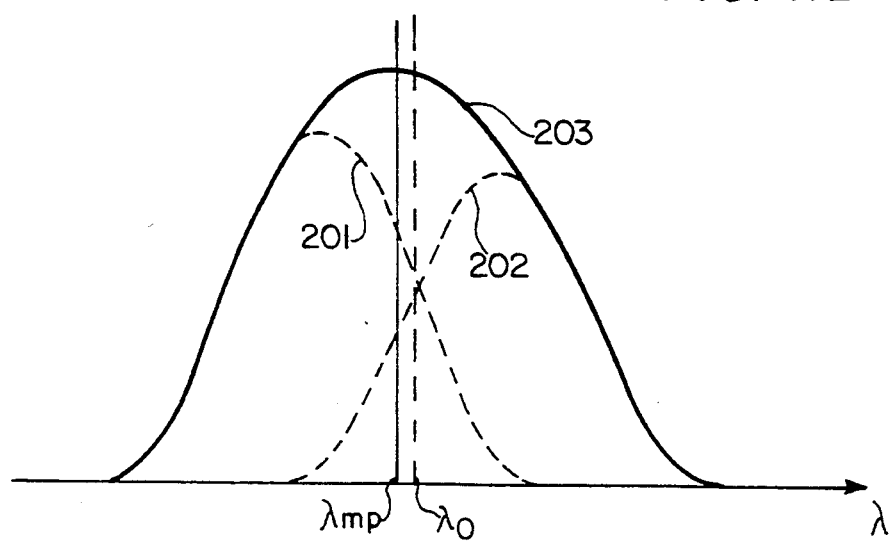

FIG. 11C shows the opposite situation.

Numerous optical fiber coupling devices with semi-transparent plates allow the source to be produced by associating elementary sources.

The signal thus obtained can be very accurate. In fact a 4-phase modulator by the electro-optical effect, such as those used in the optics integrated on lithium niobate, or by the elasto-optical effect at the time of use of a fiber extended by a piezo-electric ceramic, constitutes an optical path modulator: if its efficiency is E, it will produce when subjected to a potential difference V, an optical path difference $\delta L = E \times V$, this being independent of the wavelength (of the first order). This causes a variation in the phase difference $\delta\Phi = 2\pi\delta L/\lambda = 2\pi EV/\lambda$. The efficiency of the 4-phase modulator is therefore inversely proportional to the wavelength $\lambda$.

The processing of signal $33_p$ by the first electronic means (7), starting from the signal received from the first detector (3), therefore slaves the efficiency of the phase modulation chain against a reference value for the phase difference which could be $\Phi_0$ for example, the mean wavelength of the main spectrum. In other words the efficiency is in fact slaved against an optical path difference $\Phi L_0$ such that: $\Phi_0 = 2\pi\delta L_0/\lambda_{mp}$. This signifies that for a=2, i.e. $\Phi_0 = 2\pi/3$, $\delta 101$ $_{L0}$ is slaved at $\lambda_{mp}/3$.

However, this slaving of optical path $\Phi L_0$, results in, for the filtered spectrum, on signal $33_f$ modulation of the phase difference $\Phi'_0$, $-\Phi'_0$, $a\Phi'_0$, $-a\Phi'_0$ with $\Phi'_0 = 2\pi\delta L_0/\lambda_{mf}$ and therefore $\Phi'_0 = (\lambda_{mp}/\lambda_{mf})\Phi_0$. When $\lambda_{mp}$ is different from $\lambda_{mf}$, then $\Phi'_0$ is different from $\Phi_0$, and signal $33_f$ can be used to measure the shift between $\Phi_0$ and $\Phi'_0$ and therefore between $\lambda_{mp}$ and $\lambda_{mf}$.

The wavelength difference therefore results in a variation in phase difference. Since phase differences of $10^{-6}$ to $10^{-7}$ radians can be easily measured, a relative variation of $10^{-6}$ to $10^{-7}$ of the wavelength can also be measured.

Up to this point, a first construction method has been defined in which the modulation signal periodically takes four states. In another preferred construction method command signal $V_m$ is determined and generated by the modulation generator (12) in such a way that the phase difference $\delta\Phi m$ takes periodically eight values:

$$\delta\Phi_1 = (\Phi_0 + d\Phi_0) \qquad \delta\Phi'_1 = (\Phi_0 - d\Phi_0)$$
$$\delta\Phi_2 = -(\Phi_0 + d\Phi_0) \qquad \delta\Phi'_2 = -(\Phi_0 - d\Phi_0)$$
$$\delta\Phi_3 = a(\Phi_0 + d\Phi_0) \qquad \delta\Phi'_3 = a(\Phi_0 - d\Phi_0)$$
$$\delta\Phi_4 = -a(\Phi_0 + d\Phi_0) \qquad \delta\Phi'_4 = -a(\Phi_0 - d\Phi_0)$$

These values of the phase difference produce in response for the main flux and for the filtered flux respectively, the values $x_1$, $x'_1$, $x_2$, $x'_2$, $x_3$, $x'_3$, $x_4$, $x'_4$ (respectively noted with the corresponding $p$ and $f$ indices).

The main spectrum is used by the processing system (16) of the first processing unit (7) which regroups the values $x_{1p}$ to $x'_{4p}$ in two's according to the law:

$$x_{1p}=(x_{1p}+x'_{1p})/2, \quad x_{2p}=(x_{2p}+x'_{2p})/2$$
$$x_{3p}=(x_{3p}+x'_{3p})/2, \quad x_{4p}=(x_{4p}+x'_{4p})/2$$

and performs the operation $(x_{1p}+x_{3p})-(x_{2p}+x_{4p})$ which is then used to slave the phase difference $\delta\Phi_m$ against its mean reference value between $(\Phi_0+d\Phi_0)$ and $(\Phi_0-d\Phi_0)$, i.e. $\Phi_0$.

The value of parameter p can then be obtained by performing the operation $(x_{1p}+x_{4p})-(x_{2p}+x_{3p})$.

The second processing unit (216) to process the signal received from the second detector selects the states $x_{1f}$, $x_{2f}$, $x_{3f}$, $x_{4f}$.

The phase modulation on the eight states indicated above also creates an 8-state modulation of the difference of working:

$$\delta L_0 + dL_0 \qquad \delta L_0 - dL_0$$
$$-(\delta L_0 + dL_0) \qquad -(\delta L_0 - dL_0)$$
$$a(\delta L_0 + dL_0) \qquad a(\delta L_0 - dL_0)$$
$$-a(\delta L_0 + dL_0) \qquad -a(\delta L_0 - dL_0)$$

An additional counter-reaction loop by which the second means (219) command the modulation generator (12) then allow adjustment of $d\Phi_0$ so that: $(x_{1f}+x_{3f})-(x_{2f}+x_{4f})$ are slaved at zero for the signal produced by the filtered spectrum, so that for the wavelength $\lambda_{mf}$ the working difference $(\delta L_0+dL_0)$ generates a phase difference $\Phi_0$ such that:

$$\Phi_0 = 2\pi(\delta L_0 + dL_0)\lambda_{mf}$$

$\delta L0$ similarly being slaved in such a way that:

$$\Phi_0 = 2\pi \delta L_0/\lambda_{mp}$$

this leads to:

$$(\delta L_0 + dL_0)/\lambda_{mf} = \delta L_0/\pi_{mp}$$

and therefore $$dL_0/\delta L_0 = d\Phi_0/\Phi_0 = (\lambda_{mf} - \lambda_{mp}/mp)$$

Thanks to these different slave loops, $d\Phi_0$ can be very accurately measured and therefore allows the difference $\delta\lambda$ to be found between the mean wavelength $\lambda_{mp}$ of the main flux and the mean wavelength $\lambda_{mf}$ of the filtered flux, which is used as a reference, since:

$$(\lambda_{mf} - \lambda_{mp}) = \delta\lambda = \lambda_{mp}(d\Phi_0/\Phi_0).$$

We claim:

1. An optical fiber measuring device in which variations in a measured parameter cause a phase difference between two waves, the measuring device comprising:
   a wide spectrum light source, with a spectrum of mean wavelength $\Lambda_{m'}$;
   a SAGNAC ring interferometer in which two counter-propagative waves travel, a propagation time of the waves between separation and recombination at wavelength $\Lambda_m$ being $\tau$;
   a first detector converting a light flux received from the interferometer into an electrical signal representing the total phase difference $\delta\Phi_t$ between the counter-propagative waves;
   a phase modulator generating a phase difference $\delta\Phi_m + \delta\Phi_{CR}$, made up of a biased component $\delta\Phi_m$ and a counter-reaction component $\delta\Phi_{CR}$;
   a first electrical means receiving an electrical signal from the first detector and supplying a signal that is a function of the measured parameter,
   the signal, a function of the measured parameter, producing a phase modulator command component $\Phi_{CR}$, which is determined in such a way that the phase difference $\delta\Phi_{CR}$ that the phase modulator command component $\Phi_{CR}$ produces between the counter-propagative waves compensates for the phase difference $\delta\Phi_p$ created by the measured parameter;
   a narrow, stable spectral filter, inserted between the interferometer and the first detector, which splits the incident flux into a main flux sent to the first detector, and a filtered flux,
   the first electronic means having first means for measuring and slaving the gain of the modulation chain starting from an operation performed by first processing means in response to the signal received from the first detector; and
   a second detector which receives the filtered flux, a response of the second detector being processed by second electronic means which in response to the signal received from the second detector, using second electronic processing means, measures a gain of the modulation chain, the gain measurement being identical to that performed by the first processing means on the signal received from the first detector, thereby supplying a signal that is a function of the difference between the mean wavelength $\lambda_{mf}$ of the filtered flux and the mean wavelength $\lambda_{mp}$ of the main flux.

2. An optical device as claimed in claim 1, wherein the first and second electronic means and each comprises an analog-to-digital converter which digitizes the electrical signal received respectively from the first detector and from the second detector,
   a modulation control signal $V_m$ being determined in such a way that the biased phase difference component $\delta\Phi_m$ which the modulation control signal $V_m$ produces between the counter-propagative waves periodically takes a number of values of a multiple of four, linked in four's by the equations:

$$\delta\Phi_1 = \Phi_0 \qquad \delta\Phi_2 = a\Phi_0$$
$$\delta\Phi_3 = -\Phi_0 \qquad \delta\Phi_4 = -a\Phi_0$$

where a is a positive fixed constant and $\Phi_0$ a reference phase difference that is dependent on a, the first electronic means producing a signal that is a function of the measured parameter by using four values $X_{1p}$, $X_{2p}$, $X_{3p}$, $X_{4p}$ supplied in response to four values of a command signal $\Phi_m$ according to the formula $(X_{1p}+X_{4p})-(X_{2p}+X_{3p})$.

3. An optical device as claimed in claim 1, wherein a modulation control signal $V_m$ is determined in such a way that the biased phase difference component $\delta\Phi_m$ periodically takes four values.

4. An optical device as claimed in claim 3, wherein the first electronic means maintains the gain of the modulation chain constant by producing a gain-signal that is a function of the said gain by using four values $X_{1p}$, $X_{2p}$, $X_{3p}$, $X_{4p}$ supplied in response to the four values of the modulation control signal $V_m$ according to the formula $(X_{1p}+X_{3p})-(X_{2p}+X_{4p})$, the said gain-signal acting on the modulation chain in such a way so as to maintain the gain constant by satisfying the condition $\cos \Phi_0 = \cos a\Phi_0$, and the second electronic means produces a signal that is a function of the difference between the mean wavelength $\lambda_{mf}$ of the filtered flux and the main wavelength $\lambda_{mp}$ of the main flux using four values $X_{1f}$, $X_{2f}$, $X_{3f}$, $X_{4f}$ supplied in response to four values of the command signal $\Phi_m$ according to the formula $(X_{1f}+X_{3f})-(X_{2f}+X_{4f})$.

5. An optical device as claimed in claim 1 wherein a modulating control signal $V_m$ is determined in such a way that the biased phase difference component $\delta\Phi_m$ periodically takes eight values:

$$\delta\Phi_1 = (\Phi_0 + d\Phi_0) \qquad \delta\Phi'_1 = (\Phi_0 - d\Phi_0)$$
$$\delta\Phi_2 = -(\Phi_0 + d\Phi_0) \qquad \delta\Phi'_2 = -(\Phi_0 - d\Phi_0)$$
$$\delta\Phi_3 = a(\Phi_0 + d\Phi_0) \qquad \delta\Phi'_3 = a(\Phi_0 - d\Phi_0)$$
$$\delta\Phi_4 = -a(\Phi_0 + d\Phi_0) \qquad \delta\Phi'_4 = -a(\Phi_0 - d\Phi_0)$$

the eight values of the phase difference producing in response, for the main flux, values $X_{1p}$, $X'_{1p}$, $X_{2p}$, $X'_{2p}$, $X_{3p}$, $X'_{3p}$, $X_{4p}$, $X'_{4p}$, and for the secondary flux, values $X_{1f}$, $X'_{1f}$, $X_{2f}$, $X'_{2f}$, $X_{3f}$, $X'_{3f}$, $X_{4f}$, $X'_{4f}$, with the first processing unit regrouping in two's the values $X_{1p}$ to $X'_{4p}$ according to the law:

$$\mathcal{X}_{1p}=(X_{1p}+X'_{1p})/2, \mathcal{X}_{2p}=(X_{2p}+X'_{2p})/2$$

$$\mathcal{X}_{3p}=(X_{3p}+X'_{3p})/2, \mathcal{X}_{4p}=(X_{4p}+X'_{4p})/2$$

to perform the operation $(\mathcal{X}_{1p}+\mathcal{X}_{3p})-(\mathcal{X}_{2p}+\mathcal{X}_{4p})$ and then using the signal thus produced by the first electrical means to slave the gain of the modulation chain, and that the second processing means processing the signal sent from the second detector selects the states $X_{1f}$, $X_{2f}$, $X_{3f}$, $X_{4f}$, and performs the operation $(X_{1f}+X_{3f})-(X_{2f}+X_{4f})$, using the signal thus produced by the second processing means to control the value of $d\Phi_0$ and to generate a measurement of the difference between the mean wavelength $\lambda_{mf}$ of the filtered flux and the mean wavelength $\lambda_{mp}$ of the main flux.

6. An optical fiber measurement device according to claim 1, wherein the signal that is a function of the spectrum of the light source supplied by the second electronic processing means (27) commands the said light source (1) in such a way so as to slave the mean wavelength $\lambda_{mp}$ of the main flux against the mean wavelength $\lambda_{mf}$ of the filtered flux.

7. An optical device according to claim 4 wherein a=3.

8. An optical device according to claim 4 wherein a=2.

9. An optical device according to claim 1 wherein the spectral filter is a stable Fabry-Perot filter.

10. An optical device according to claim 1 wherein the mean wavelength $\lambda_m$ of the spectrum of the source is 1.3 $\mu$m.

11. An optical device according to claim 1 wherein the light source comprises two associated elementary sources, in such a way that the variation in the relative intensity of the elementary sources is used to vary its mean wavelength.

12. A gyrometer in which variations in a measured parameter cause a phase difference between two waves, the gyrometer comprising:

a wide spectrum light source with a spectrum of mean wavelength $\lambda_m$;

a SAGNAC ring interferometer in which two counter-propagative waves travel, the propagation time of the waves between separation and recombination at wavelength $\lambda_m$ being $\tau$, and the measured parameter being a rotational speed of the interferometer;

a first detector converting a light flux received from the interferometer into an electrical signal representing the total phase difference $\delta\Phi_t$ between the counter-propagative waves;

a phase modulator generating a phase difference $\delta\Phi_m + \delta\Phi_{CR}$, made up of a biased component $\delta\Phi_m$ and a counter-reaction component $\delta\Phi_{CR}$;

a first electrical means receiving an electrical signal from the first detector and supplying a signal that is a function of the rotational speed of the interferometers, the signal, a function of the rotational speed of the interferometer, producing a phase modulator command component $\Phi_{CR}$, which is determined in such a way that the phase difference $\delta\Phi_{CR}$ that the phase modulator command component $\Phi_{CR}$ produces between the counter-propagative waves compensates for the phase difference $\delta\Phi_p$ created by the rotational speed of the interferometer;

a narrow, stable spectral filter, inserted between the interferometer and the first detector which splits the incident flux into a main flux sent to the first detector, and a filtered flux, the first electronic means having first means for measuring and slaving the gain of the modulation chain starting from an operation performed by first processing means in response to the signal received from the first detector; and a second detector which receives the filtered flux, a response of the second detector being processed by second electronic means which in response to the signal received from the second detector, using second electronic processing means, measures the gain of the modulation chain, the said gain measurement being identical to that performed by the first processing means on the signal received from the first detector, thereby supplying a signal that is a function of the difference between the mean wavelength $\Lambda_{mf}$ of the filtered flux and the mean wavelength $\Lambda_{mp}$ of the main flux.

13. An inertial navigation or stabilization processing central unit comprising at least one gyrometer in which variations in a measured parameter cause a phase difference between two waves, said gyrometer including:

a wide spectrum light source with a spectrum of mean wavelength $\Lambda_m$;

a SAGNAC ring interferometer in which two counter-propagative waves travel, the propagation time of the waves between separation and recombination at wavelength $\Lambda_m$ being $\tau$, and the measured parameter being a rotational speed of the interferometer;

a first detector converting a light flux received from the interferometer into an electrical signal representing the total phase difference $\delta\Phi_t$ between the counter-propagative waves;

a phase modulator generating a phase difference $\delta\Phi_m + \delta\Phi_{CR}$, made up of a biased component $\delta\Phi_m$ and a counter-reaction component $\delta\Phi_{CR}$;

a first electrical means receiving an electrical signal from the first detector and supplying a signal that is a function of the rotational speed of the interferometer, the signal, a function of the rotational speed of the interferometer, producing a phase modulator command component $\Phi_{CR}$, which is determined in such a way that the phase difference $\delta\Phi_{CR}$ that the phase modulator command component $\Phi_{CR}$ produces between the counter-propagative waves compensates for the phase difference $\delta\Phi_p$ created by the rotational speed of the interferometer;

a narrow, stable spectral filter, inserted between the interferometer and the first detector which splits the incident flux into a main flux sent to the first detector, and a filtered flux, the first electronic means having first means for measuring and slaving the gain of the modulation chain starting from an operation performed by first processing means in response to the signal received from the first detector; and a second detector which receives the filtered flux, a response of the second detector being processed by second electronic means which in response to the signal received from the second detector, using second electronic processing means, measures the gain of the modulation chain, the said gain measurement being identical to that performed by the first processing means on the signal received from the first detector, thereby supplying a signal that is a function of the difference between the mean wavelength $\Lambda_{mf}$ of the filtered flux and the mean wavelength $\Lambda_{mp}$ of the main flux.

* * * * *